(12) United States Patent
Satake et al.

(10) Patent No.: US 7,448,711 B2
(45) Date of Patent: *Nov. 11, 2008

(54) IMAGE-FORMING APPARATUS AND METHOD FOR CONTROLLING THE SAME

(75) Inventors: Makoto Satake, Chiba (JP); Akitoshi Kikuchi, Chiba (JP); Tomoyuki Takeda, Ibaragi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/354,827

(22) Filed: Feb. 16, 2006

(65) Prior Publication Data

US 2006/0132532 A1 Jun. 22, 2006

Related U.S. Application Data

(62) Division of application No. 10/759,053, filed on Jan. 20, 2004, now Pat. No. 7,029,086.

(30) Foreign Application Priority Data

Jan. 24, 2003 (JP) ............................. 2003-015659
Feb. 14, 2003 (JP) ............................. 2003-036373

(51) Int. Cl.
*B41J 29/38* (2006.01)
*B41J 29/393* (2006.01)
*H04N 1/034* (2006.01)
*H04N 1/21* (2006.01)
*H04N 1/00* (2006.01)

(52) U.S. Cl. ............................. 347/14; 347/3; 347/19; 358/296; 358/401; 358/1.16

(58) Field of Classification Search ................ 347/3, 347/8, 14, 16, 19, 37, 101, 104, 153; 358/296, 358/401, 1.12, 1.16, 472, 1.15, 1.9, 468; 400/56, 58, 59, 73, 23, 30; 101/35, 44, 486; 369/30, 99

See application file for complete search history.

(56) References Cited

U.S. PATENT DOCUMENTS 5,572,630 A 11/1996 Azuma et al. ............... 395/111

(Continued)

FOREIGN PATENT DOCUMENTS

EP 1 156 658 A2 11/2001

(Continued)

*Primary Examiner*—Shih-Wen Hsieh
(74) *Attorney, Agent, or Firm*—Fitzpatrick, Cella, Harper & Scinto

(57) ABSTRACT

An image-forming apparatus includes a first monitor which detects whether a non-paper-medium supplier is attached to the main body of the image-forming apparatus. When a normal copying process is selected, the copying process is stopped immediately if the first monitor determines that the non-paper-medium supplier is attached and an error message indicating that a printing process cannot be performed since the non-paper-medium supplier is attached is shown on the main body. In addition, if a facsimile is received while the non-paper-medium supplier is attached to the main body, the user is informed that the facsimile call is received. Accordingly, the user can change the setting of the image-forming apparatus so that the facsimile can be received. Thus, the facsimile is received manually if the non-paper-medium supplier is attached to the main body and is received by operation after the line is acquired by a handset telephone.

6 Claims, 16 Drawing Sheets

U.S. PATENT DOCUMENTS

| | | | |
|---|---|---|---|
| 5,917,611 A | 6/1999 | Sakai et al. | 358/400 |
| 6,570,667 B1 * | 5/2003 | Hattori et al. | 358/1.15 |
| 6,894,798 B2 | 5/2005 | Yashiki | 358/1.15 |
| 2002/0051168 A1 | 5/2002 | Yashiki | 358/1.15 |

FOREIGN PATENT DOCUMENTS

| | | |
|---|---|---|
| EP | 1 190 857 A2 | 3/2002 |
| JP | 2002-356029 A | 12/2002 |
| WO | WO99/52713 | 10/1999 |

* cited by examiner

IMAGE-FORMING APPARATUS AND METHOD FOR CONTROLLING THE SAME

CROSS-REFERENCE TO RELATED APPLICATION

This application is a divisional of U.S. patent application Ser. No. 10/759,053, filed Jan. 20, 2004, now U.S. Pat. No. 7,029,086 the entire disclosure of which is incorporated herein by reference.

BACKGROUND OF THE INVENTION

1. Field of the Invention

The present invention relates to an image-forming apparatus which includes a recording unit provided with a non-paper-medium supplier which supplies a non-paper medium, which is a medium other than paper, to a printing unit in addition to a paper-medium supplier which supplies a paper medium to the printing unit. In addition, the present invention also relates to an image-forming apparatus such as a multifunction printer (MFP) which has a facsimile function and a method for controlling the image-forming apparatus.

2. Description of the Related Art

Recently, inkjet printers including a non-paper-medium supplier which supplies a non-paper medium, such as a compact disc recordable (CDR), to a printing unit in addition to a paper-medium supplier, such as an automatic sheet feeder (ASF), which supplies a paper medium to the printing unit have become popular. In such an inkjet printer, data processed by an information processing terminal such as a personal computer (PC) can be printed on the non-paper medium.

On the other hand, multifunction machines which can be connected to an information processing terminal such as a PC, which include a reading unit constructed of contact image sensors (CIS) and charge-coupled devices (CCDs), and which serve various functions such as a copy function, a PC print function, a facsimile function, etc. have also become popular.

Accordingly, a multifunction machine which includes a recording device (printer) having the non-paper-medium supplier which supplies the non-paper medium such as a CDR to the printing unit can be obtained.

In the case in which the recording machine including the non-paper-medium supplier which supplies the non-paper medium such as a CDR to the printing unit is mounted in the multifunction machine having functions such as a copy function, a PC print function, a facsimile function, etc., the paper-medium supplier and the non-paper-medium supplier must be used selectively depending on the function performed.

For example, if the non-paper-medium supplier is attached to the main body of the image-forming apparatus when a normal copying process or a facsimile-receiving process is performed, there is a risk that a copy image or a facsimile image will be printed on the non-paper medium such as a CDR.

In addition, if a printing process using the paper-medium supplier is started when the non-paper-medium supplier is attached to the main body of the image-forming apparatus, paper jam occurs due to structural reasons and the printing process cannot be performed.

Accordingly, if the non-paper-medium supplier is attached to the main body of the image-forming apparatus when the normal copying process or the facsimile-receiving process is started, the copy image or the facsimile image must be reliably prevented from being printed on the non-paper medium such as a CDR. For example, if the copying process is started, activation of the reading unit and the recording unit may be stopped, and if the facsimile-receiving process is performed, received data may be recorded on a storage medium installed in the main body instead of being transmitted to the recording unit.

In addition, when a process of printing on the non-paper medium such as a CDR using the non-paper-medium supplier is performed, the process must be stopped immediately if the non-paper-medium supplier is not attached to the main body of the image-forming apparatus.

In addition, even when the non-paper-medium supplier is attached to the main body when the process of printing on the non-paper medium such as a CDR using the non-paper-medium supplier is performed, the process must be stopped immediately if, for example, the non-paper medium such as a CDR is not loaded and it is determined that the printing process using the non-paper-medium supplier cannot be performed normally.

In the above-described multifunction machine such as a multifunction printer (MFP), facsimiles can always be received irrespective of whether a user is present, and therefore there is a possibility that a facsimile is received while the non-paper-medium supplier is attached to the main body. In such a case, although an image received via facsimile must be printed on a paper medium, it cannot be printed on the paper medium if the paper medium is not set. In addition, paper jam occurs if the process of printing on the paper medium is forcibly performed.

Such a problem can be prevented by storing all of the facsimiles received while the non-paper-medium supplier is attached to the main body in a memory. However, if all of the facsimiles are stored in the memory, the memory eventually becomes full and it becomes impossible to receive facsimiles.

More specifically, although it is not an error to attach the non-paper-medium supplier to the main body as in the cases where there is no paper or ink, if the facsimiles are received while the non-paper-medium supplier is attached to the main body, it eventually becomes impossible to receive them.

This problem also occurs in image-forming apparatuses other than facsimile machines.

SUMMARY OF THE INVENTION

An object of the present invention is to provide an image-forming apparatus which can prevent a copy image form being printed on a non-paper medium such as a CDR, which can immediately return to the standby mode without performing unnecessary processes such as activation of a reading unit and a recording unit, and which can display the reason why the printing process has stopped on the main body of the image-forming apparatus when the non-paper-medium supplier is attached to the main body and the printing process cannot be performed.

Another object of the present invention is to provide an image-forming apparatus in which a facsimile is received manually if the non-paper-medium supplier is attached to the main body and is received by operation after the line is acquired by a telephone so that paper jam, which occurs when the process of printing on the paper medium is forcibly performed, can be prevented even when the non-paper-medium supplier is attached to the main body. In addition, it is also an object of the present invention to provide a method for controlling the image-forming apparatus.

Further objects, features and advantages of the present invention will become apparent from the following description of the preferred embodiments with reference to the attached drawings.

DESCRIPTION OF THE PREFERRED EMBODIMENTS

An image-forming apparatus according to the present invention includes a first monitor which detects whether a non-paper-medium supplier is attached to the main body of the image-forming apparatus. When a normal copying process is selected, the copying process is stopped immediately if the first monitor determines that the non-paper-medium supplier is attached to the main body and an error message indicating that a printing process cannot be performed since the non-paper-medium supplier is attached is shown on the main body of the image-forming apparatus.

First Embodiment

Figure 1:
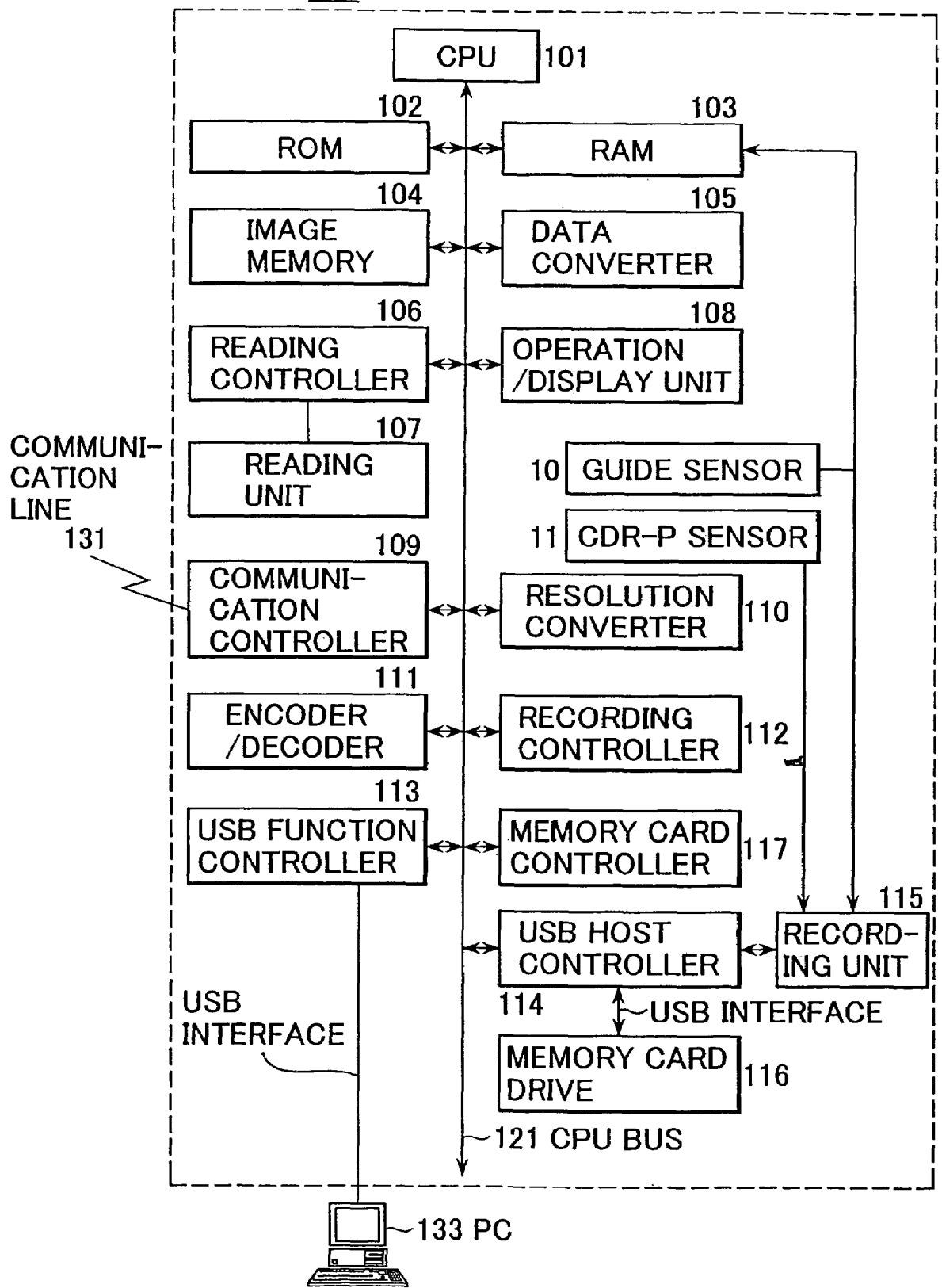
FIG. 1 is a schematic block diagram of an image-forming apparatus according to a first embodiment of the present invention.

FIG. 1 is a schematic block diagram of an image-forming apparatus 100 according to a first embodiment of the present invention.

In the image-forming apparatus 100, a central processing unit (CPU) 101 serves as a system controller and controls the overall operation of the image-forming apparatus 100.

A read only memory (ROM) 102 stores control programs executed by the CPU 101, an embedded operating system (OS), etc. In the present embodiment, the control programs stored in the ROM 102 are used for software control such as scheduling and task switching under the management of the embedded OS which is stored in the ROM 102.

A random access memory (RAM) 103 is, for example, a static RAM (SRAM) which stores program control variables, values assigned by a user, management data for the image-forming apparatus 100, etc., and a buffer area for various tasks is allocated in the RAM 103.

An image memory 104 is, for example, a dynamic RAM (DRAM) which stores image data.

A data converter 105 performs computer graphics (CG) expansion of character data and converts image data into print data.

A reading unit 107 optically reads an original with a contact image sensor (CIS) and converts the obtained image signal into electrical image data, and a reading controller 106 performs various image processes such as a binarization process and a halftone process of the image data with an image processing controller (not shown) and outputs high-definition image data. In the present embodiment, the reading controller 106 is compatible with both a sheet-reading-control method in which the original is conveyed while it is read and a book-reading-control method in which the original is scanned while it is placed on an original table.

An operation/display unit 108 includes an operating unit which includes number keys, character keys, one-touch dialing keys, mode-setting keys, an enter key, a cancel key, etc. and which is used by the user to input data regarding a terminal to which an image is transmitted or register set data, and a display unit which includes various keys, light-emitting diodes (LEDs), a liquid crystal display (LCD), etc., and which is used for displaying the states of various input operations performed by the user, the operational state of the image-forming apparatus 100, the status information, etc.

A communication controller 109 includes a modulator/demodulator (MODEM), a network control unit (NCU), etc. In the present embodiment, the communication controller 109 is connected to an analog communication line (public switched telephone network (PSTN)) 131, and performs communication control under the T.30 protocol and line control of call-ins and call-outs on the communication line.

A resolution converter 110 controls resolution conversion, such as millimeter-to-inch resolution conversion, of the image data. The resolution converter 110 can also enlarge or reduce the image size.

An encoder/decoder 111 encodes and decodes the image data (MH, MR, MMR, JBIG, JPEG, etc.) processed by the image-forming apparatus 100. The encoder/decoder 111 also enlarges or reduces the image size.

A recording controller 112 performs various image processes such as a smoothing process, a recording-density-correction process, and a color-correction process of image data to be printed with an image processing controller (not shown) and outputs high-definition image data to a universal serial bus (USB) host controller 114. In addition, the recording controller 112 also controls the USB host controller 114 to periodically obtain data regarding the state of a recording unit 115.

A USB function controller 113 performs communication control of a USB interface and protocol control based on the USB standard. The USB function controller 113 converts data obtained by the USB control task performed by the CPU 101 into packets and transmits the packets to an external information processing terminal 133 via the USB interface. In addition, the USB function controller 113 also receives USB packets received from the external information processing terminal 133, converts them into data, and transmits the thus obtained data to the CPU 101.

The USB host controller 114 controls the communication under the protocol based on the USB standard. The USB standard is used for high-speed two-way data communication, and a plurality of hubs or functions (slaves) can be connected to a single host (master). The USB host controller 114 serves as a host in the USB communication.

The recording unit 115 is a printer such as a laser beam printer and an inkjet printer, and is used for printing a color image or a monochrome image on a print medium. The recording unit 115 communicates with the USB host controller 114 under the protocol based on the USB standard, and serves as a function in the USB communication.

A guide sensor 10 is constructed of a micro switch and detects a CDR guide unit 2, which serves as a non-paper-medium supplier, when the CDR guide unit 2 is attached. The output from the guide sensor 10 is input to both the CPU 101 and the recording unit 115.

A CDR-P sensor 11 is constructed of a reflective photo-interrupter and detects a CDR 4 placed on a CDR tray 3 when the CDR 4 reaches a print position. The output from the CDR-P sensor 11 is input to the recording unit 115.

In the present embodiment, one-to-one USB communication is provided for the recording function.

The above-described components denoted by reference numerals 101 to 106, 108 to 114, and 117 are connected to each other via a CPU bus 121 which is managed by the CPU 101.

Figure 2:
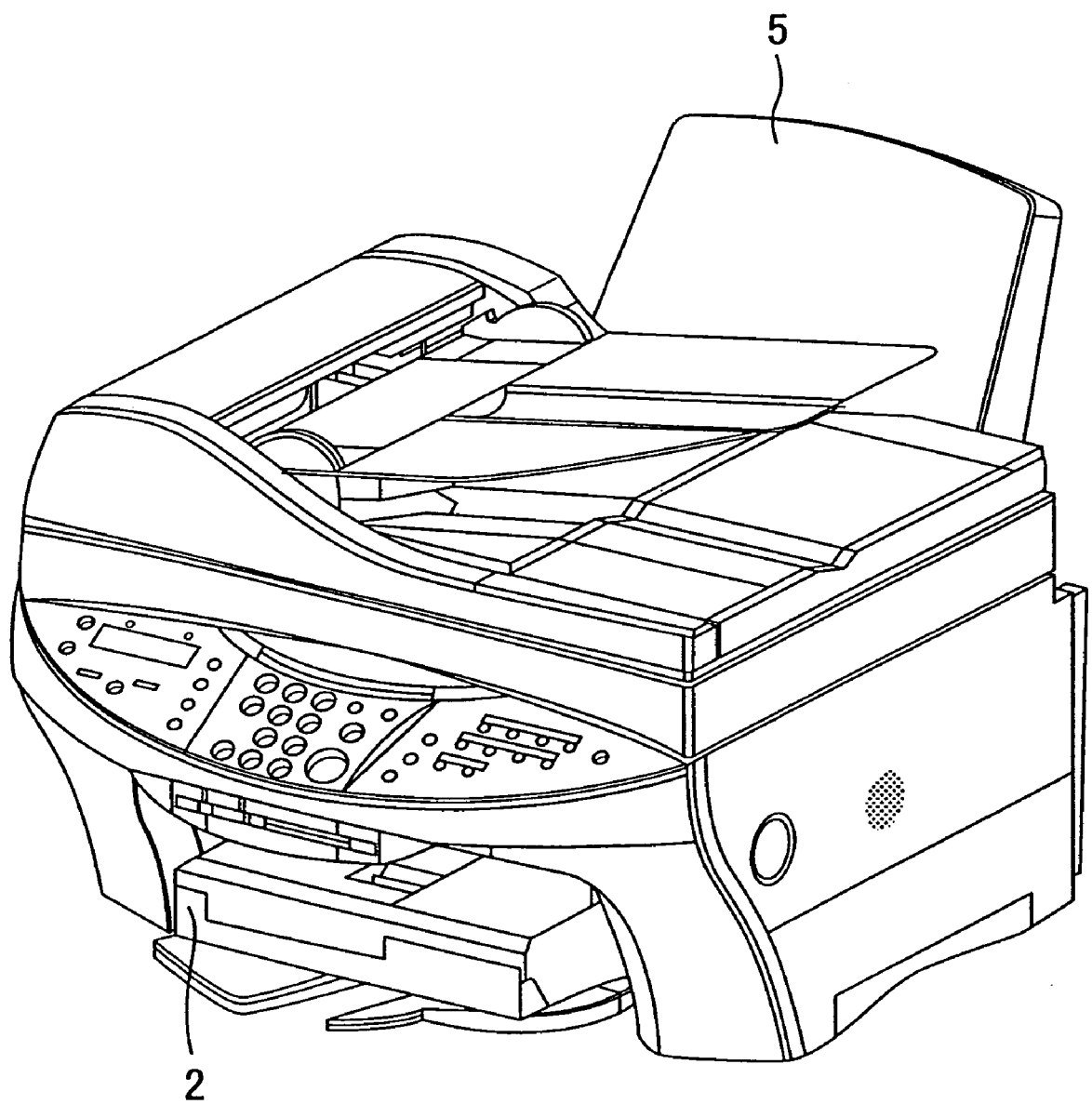
FIG. 2 is a perspective view of the image-forming apparatus in the state in which an CDR guide unit and a paper tray are attached.

FIG. 2 is a perspective view of the image-forming apparatus 100 in the state in which the CDR guide unit 2 and a paper tray 5 are attached.

The paper tray 5 holds paper sheets and is generally called an automatic sheet feeder. The paper tray 5 is an example of a paper-medium supplier which conveys the paper sheets. The CDR guide unit 2 is used for printing on a CDR by the image-forming apparatus 100, and is an example of a non-paper-medium supplier. A non-paper medium is a medium other than paper, such as a CDR.

Figure 3:
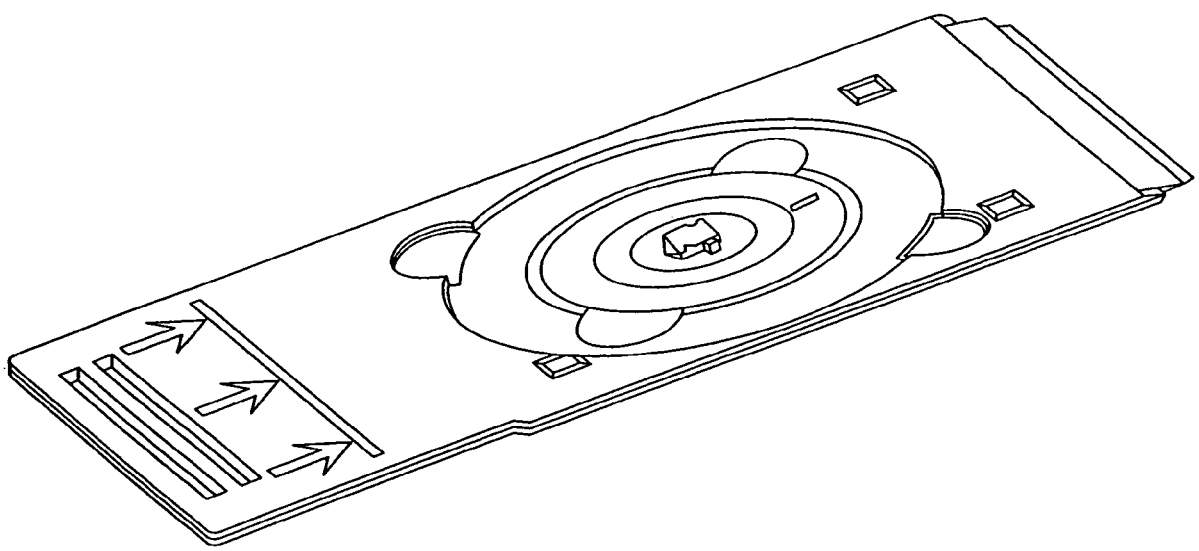
FIG. 3 is a perspective view of a CDR tray.

FIG. 3 is a perspective view of the CDR tray 3.

Figure 4:
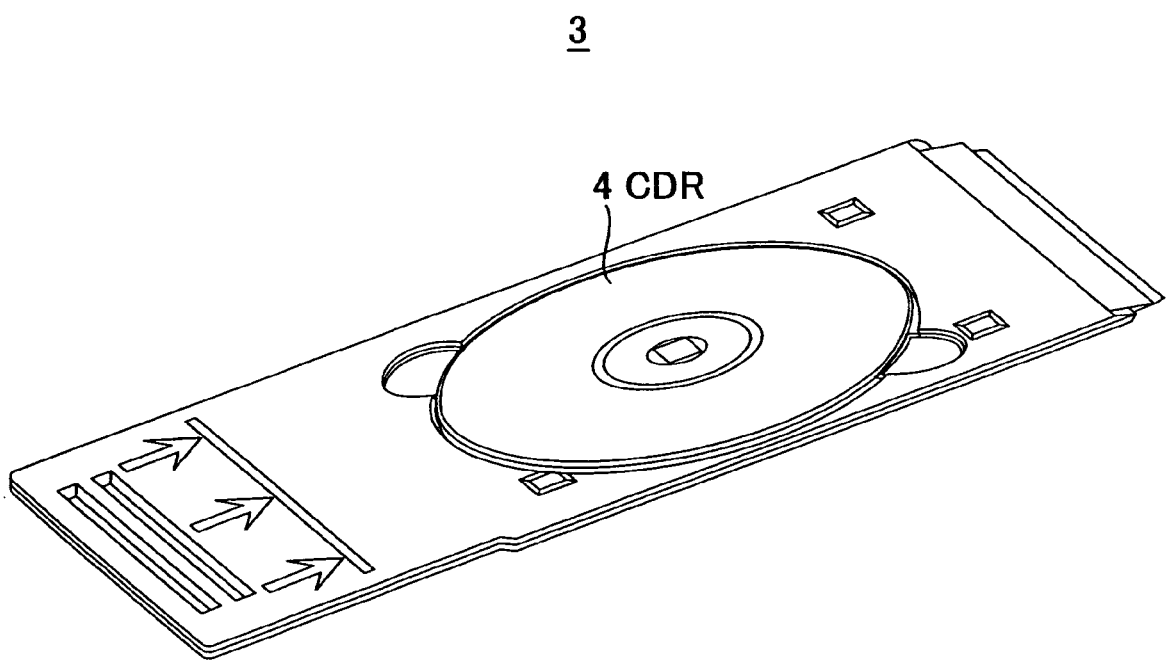
FIG. 4 is a diagram showing the state in which a CDR is placed on the CDR tray.

FIG. 4 is a diagram showing the state in which the CDR 4 is placed on the CDR tray 3.

Figure 5:
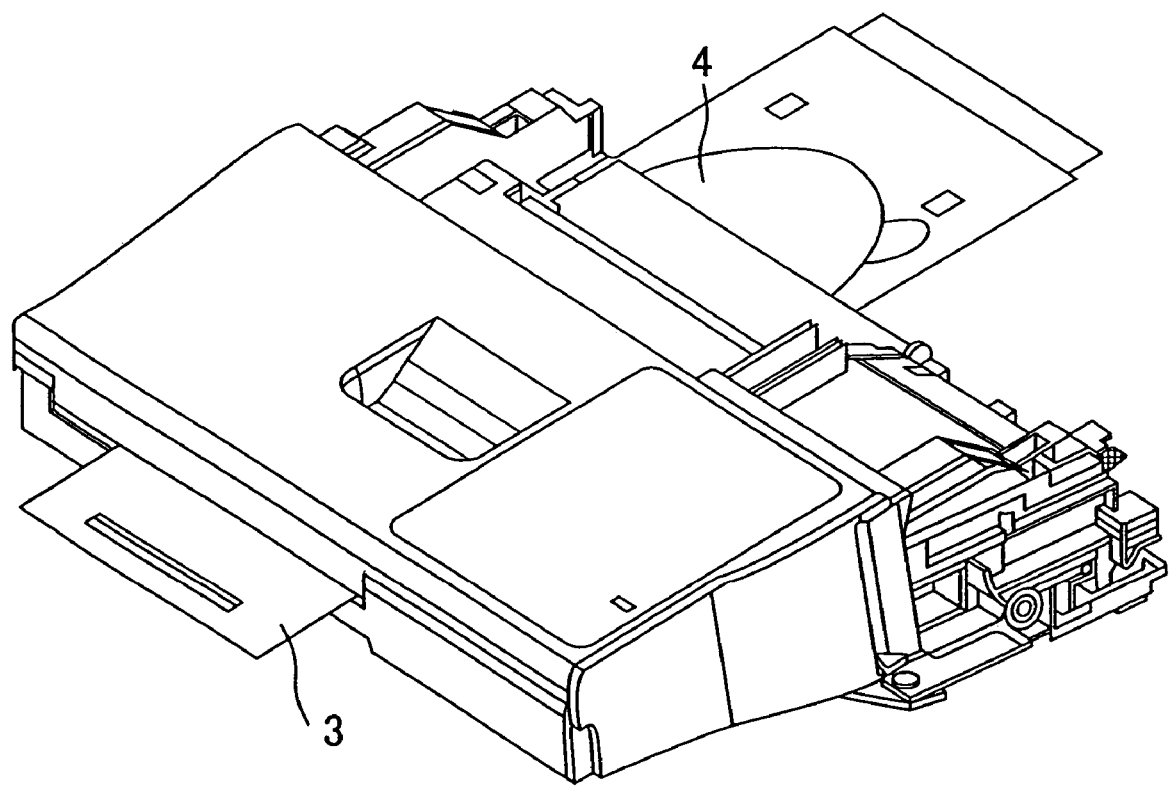
FIG. 5 is a diagram showing the state in which the CDR tray is inserted in the CDR guide unit.

FIG. 5 is a diagram showing the state in which the CDR tray 3 is inserted in the CDR guide unit 2.

When the CDR guide unit 2 is attached to the main body of the image-forming apparatus 100, the CDR tray 3 is driven by a motor installed in the main body and is conveyed inward or outward.

Figure 6:
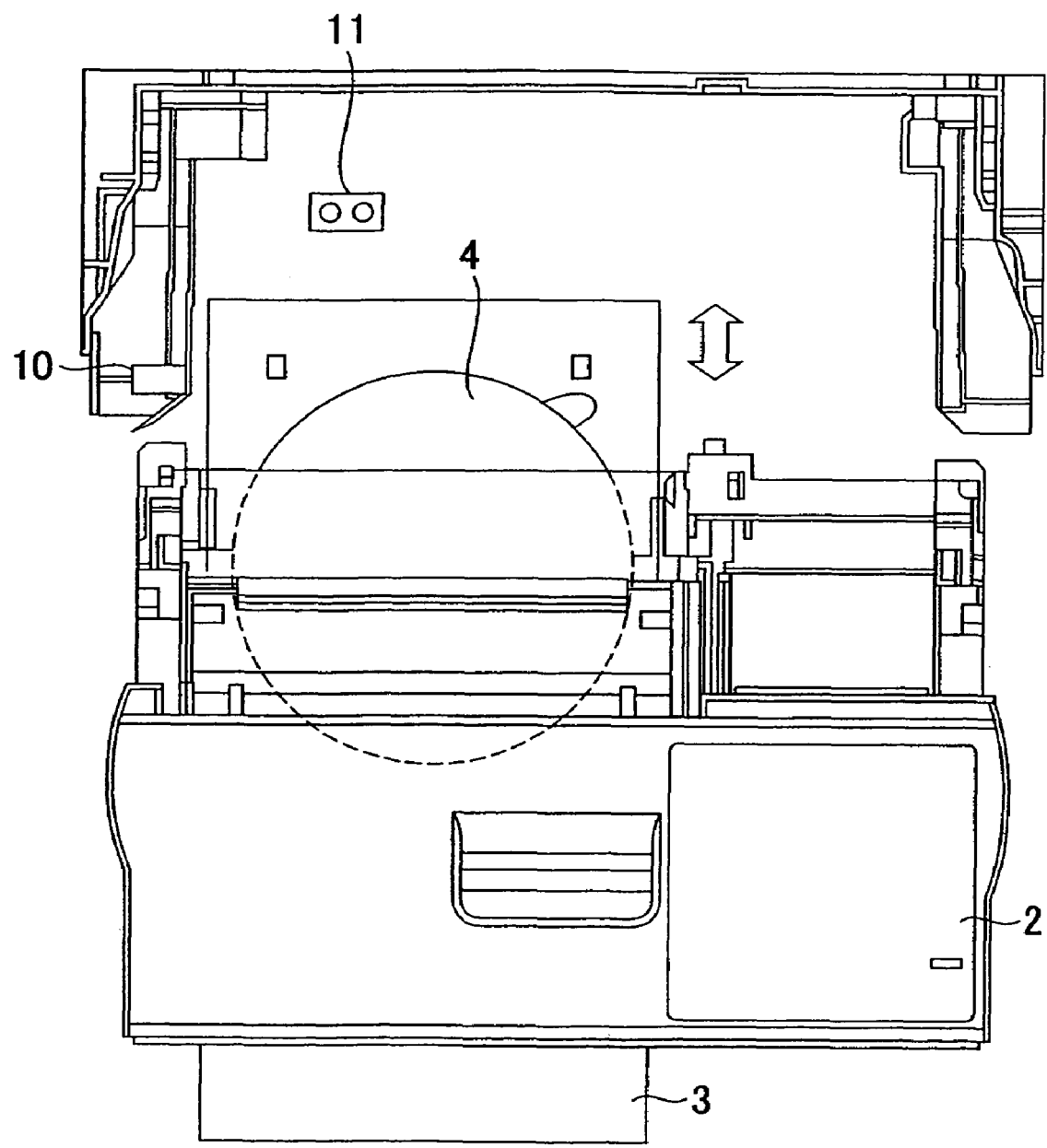
FIG. 6 is a diagram showing the manner in which the CDR guide unit and the CDR tray are attached to the main body.

FIG. 6 is a diagram showing the manner in which the CDR guide unit 2 and the CDR tray 3 are attached to the main body.

When the CDR guide unit 2 is attached to the main body, it comes into contact with a contact point of the guide sensor 10 constructed of a micro switch which is installed in the main body and the output from the guide sensor 10 changes accordingly. Then, when the CDR tray 3 on which the CDR 4 is placed is inserted into the CDR guide unit 2, the CDR tray 3 is moved by the motor installed in the main body and is conveyed to the print position. When the CDR tray 3 reaches the print position, the CDR-P sensor 11 constructed of a reflective photo-interrupter attached to the main body detects light reflected from the CDR 4 and the output from the CDR-P sensor 11 changes accordingly.

Figure 7:
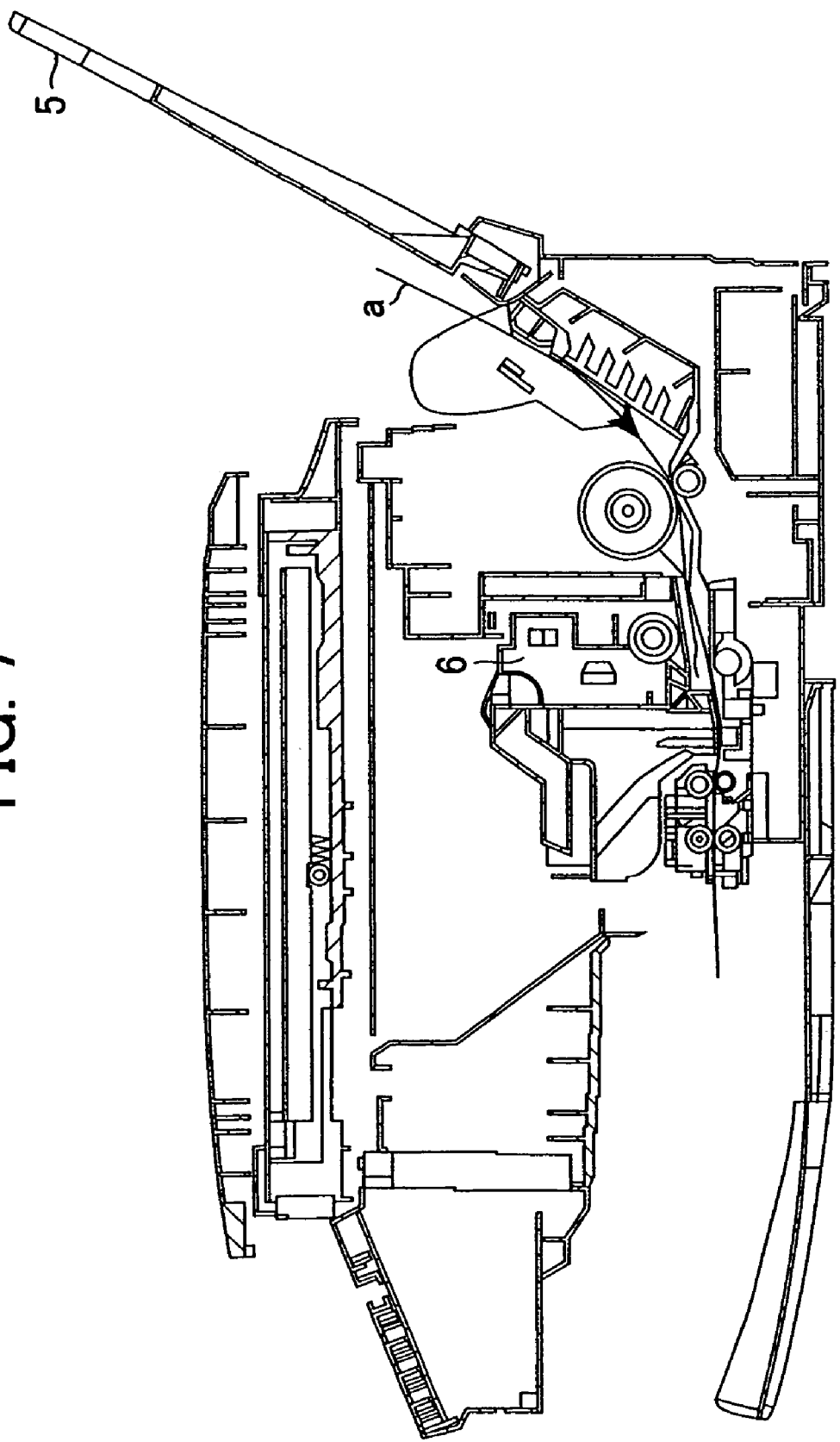
FIG. 7 is a sectional view showing a paper path (paper-medium supplier) used in a process of printing on a paper sheet.

FIG. 7 is a sectional view showing a paper path (paper-medium supplier) used in a process of printing on a paper sheet.

The paper sheet placed on the paper tray 5 is conveyed along the path denoted by a in FIG. 7, and is output after an image is printed on the paper sheet at a position where a head 6 is placed.

Figure 8:
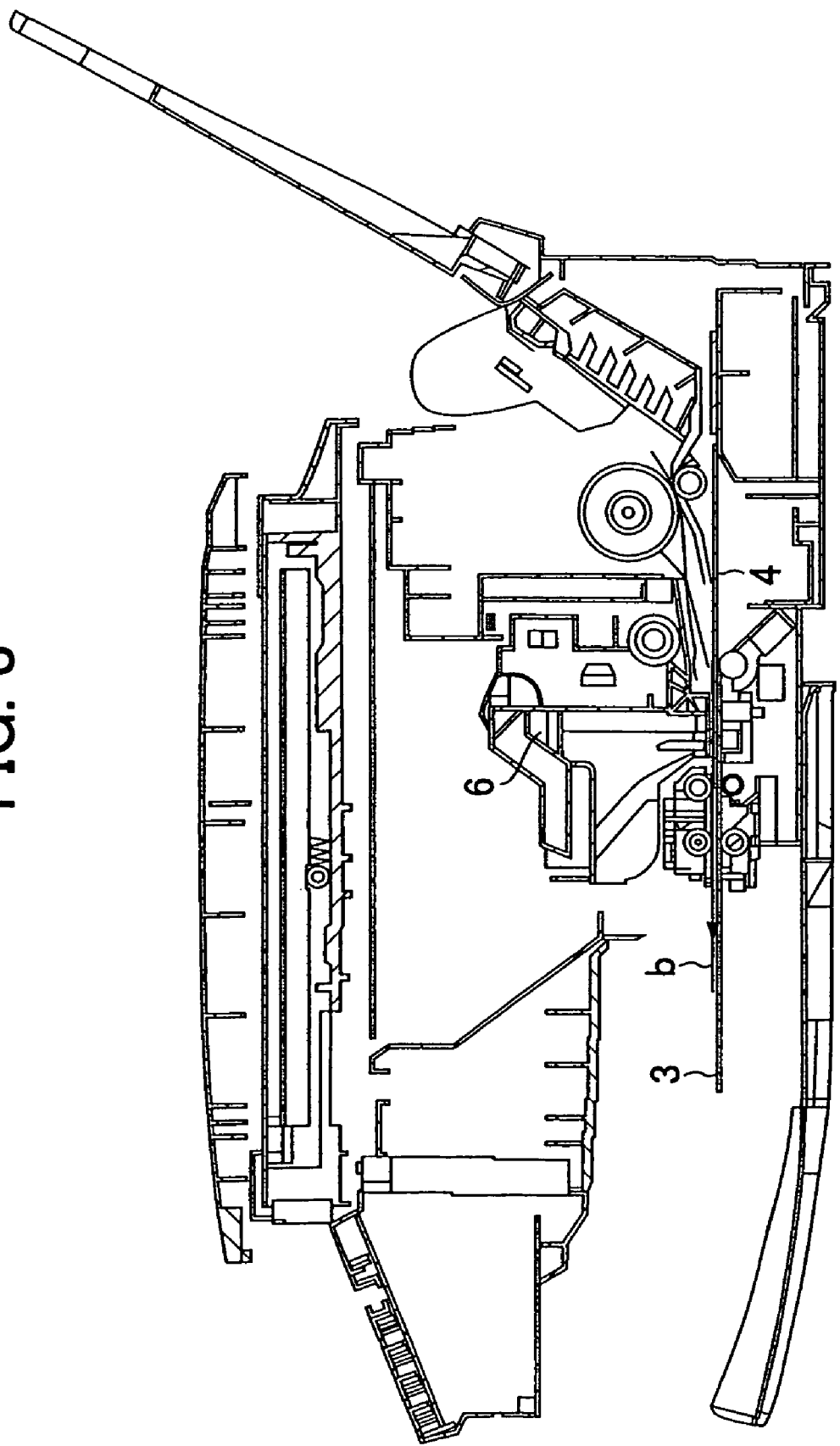
FIG. 8 is a sectional view showing a recording-medium (CDR) path (non-paper-medium supplier) used in a process of printing on the CDR.

FIG. 8 is a sectional view showing a recording-medium (CDR) path (non-paper-medium supplier) used in a process of printing on the CDR.

The head 6 is moved upward from the position shown in FIG. 7 so that a space for the CDR tray 3 to pass through can be provided. In FIG. 8, the CDR tray 3 on which the CDR 4 is placed is inserted from the left, is conveyed to the right end, and is conveyed leftward while an image is printed on a printing area of the CDR 4 at a position where the head 6 is placed.

As is clear from FIGS. 7 and 8, the path of the paper-medium supplier and that of the non-paper-medium supplier are basically the same. Therefore, the paper-medium supplier and the non-paper-medium supplier cannot be used at the same time. More specifically, in this structure, the process of printing on the paper sheet cannot be performed when the CDR guide unit 2 is attached.

Next, a copying process performed by the image-forming apparatus 100 will be described below.

Figure 9:
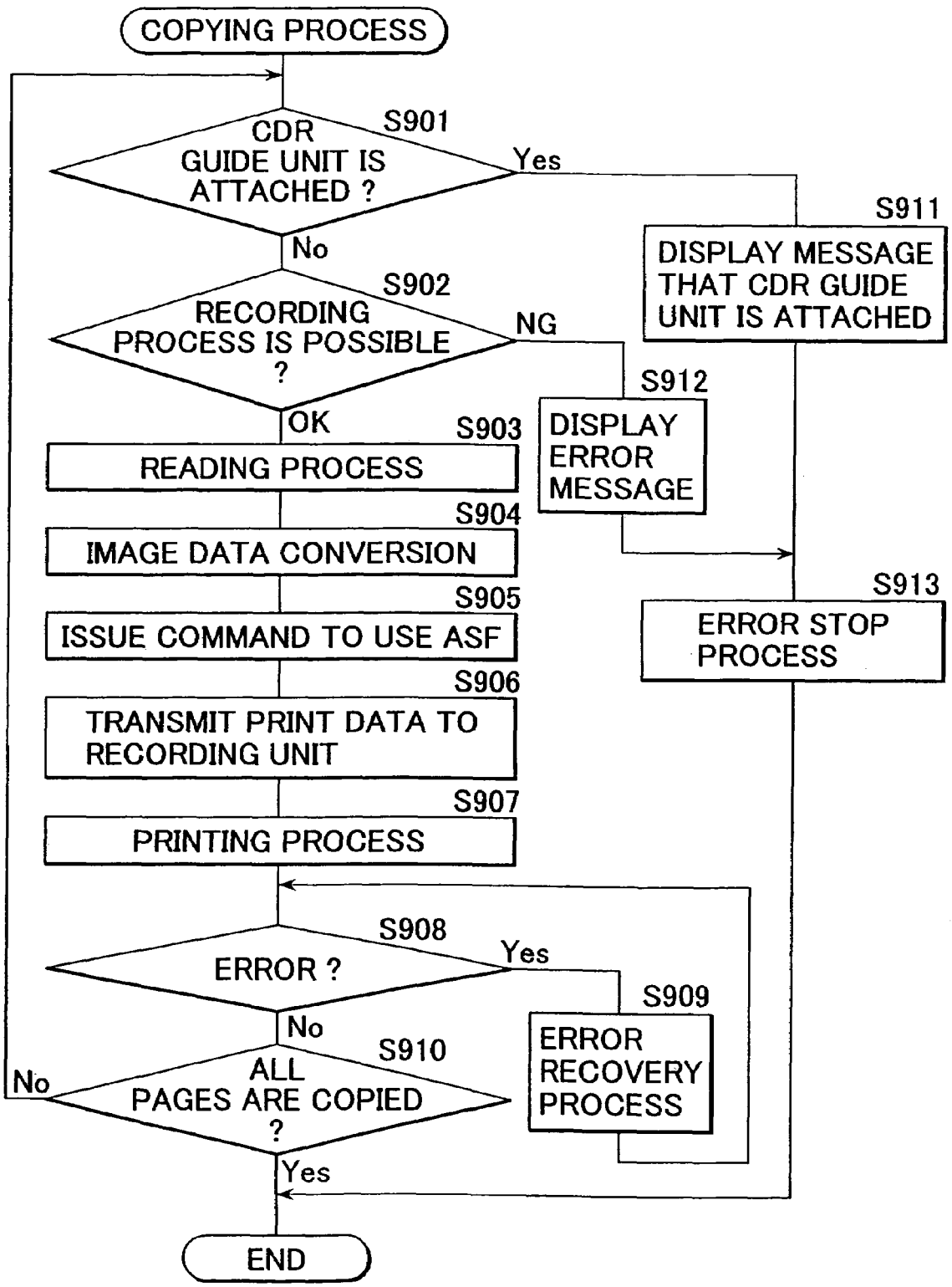
FIG. 9 is a flowchart of a copying process performed by the image-forming apparatus.

FIG. 9 is a flowchart of a copying process performed by the image-forming apparatus 100.

When an operation to start the copying process is performed by the user, a signal output from the guide sensor 10 shown in FIG. 1 is monitored and it is determined whether the CDR guide unit 2 is attached to the image-forming apparatus 100, as shown in FIG. 2, in Step 901.

If the CDR guide unit 2 is not attached, it is determined whether the recording unit 115 shown in FIG. 1 can perform a recording process in Step 902. If the CDR guide unit 2 is attached to the image-forming apparatus 100, the operation/display unit 108 shown in FIG. 1 displays a message indicating that the copying process cannot be performed in Step 911 and the process proceeds to Step 913. If it is determined that the recording unit 115 can perform the recording process in Step 902, the reading unit 107 and the reading controller 106 shown in FIG. 1 are activated and a reading process is started in Step 903.

If it is determined that the recording process cannot be performed, the operation/display unit 108 shown in FIG. 1 displays a message indicating that the recording process cannot be performed in Step 912 and the process proceeds to Step 913. In Step 913, an error-stop process is performed in which recording tasks are stopped and parameters are cleared.

In Step 904, the data converter 105 converts image data obtained in Step 903 into print data which can be printed by the recording unit 115. In Step 905, a command to supply the paper sheet from the automatic sheet feeder (ASF), that is, the paper tray 5 shown in FIG. 2, is transmitted to the recording unit 115 via the USB interface. In Step 906, the print data obtained in Step 904 is transmitted to the recording unit 115 via the USB interface.

In Step 907, the recording unit 115 receives the print data transmitted in Step 906 via the USB interface and performs a process of printing the print data on the paper sheet supplied from the automatic sheet feeder. In Step 908, it is determined whether an error has occurred during the printing process. If a recoverable error occurs, for example, when there is no paper or ink or when paper jam occurs, an error recovery process is performed in Step 909 where a message prompting the user to take a suitable action is shown or a key operation is received. If the error is resolved, the process proceeds to Step 910.

In Step 910, it is determined whether all of the pages are copied. If all of the pages are copied, a finishing process is performed and the copying process ends. If there are pages which are not yet copied, the process returns to Step 901.

Second Embodiment

Next, a facsimile-receiving process performed by an image-forming apparatus according to a second embodiment of the present invention will be described below.

The construction of the image-forming apparatus according to the second embodiment is similar to the image-forming apparatus 100 shown in FIG. 1.

Figure 10:
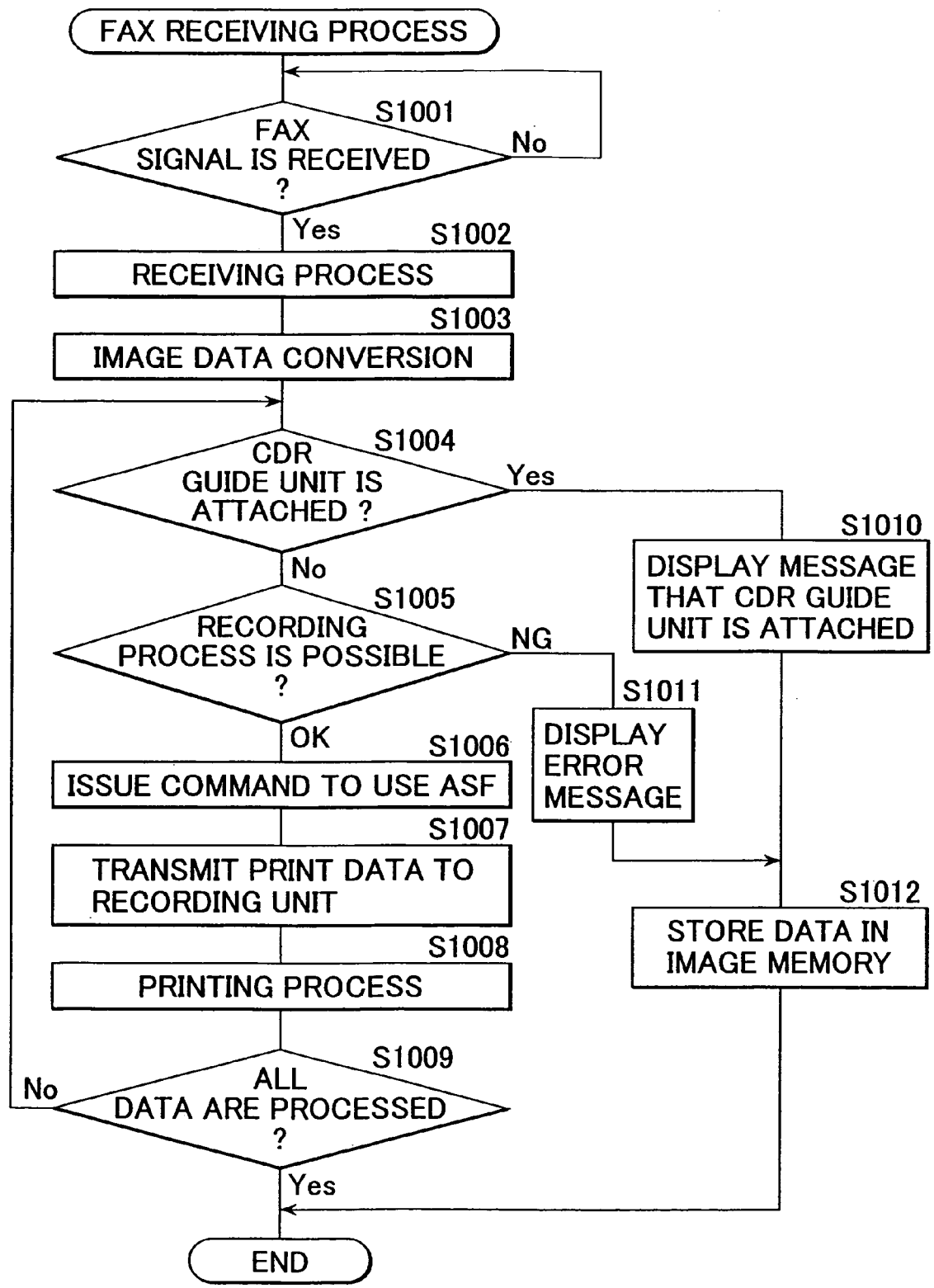
FIG. 10 is a flowchart of a facsimile-receiving process performed by an image-forming apparatus according to a second embodiment of the present invention.

FIG. 10 is a flowchart of the facsimile-receiving process performed by the image-forming apparatus according to the second embodiment of the present invention.

First, the communication controller 109 shown in FIG. 1 detects whether there is a call signal (CI) transmitted via the communication line 131. If the call signal (CI) is transmitted, the line is acquired and it is determined whether the call is a facsimile transmission by CNG tone detection or silence detection in Step 1001.

If it is determined that the call is a facsimile transmission, a facsimile communication process is started and image data transmitted via the communication line 131 is received in Step 1002. Then, after all of the image data is received, the communication line is closed and the receiving process is finished. Then, the encoder/decoder 111 shown in FIG. 1 decodes the received image data and the data converter 105 converts the obtained data into print data which can be printed by the recording unit 115 in Step 1003.

In Step 1004, the signal output from the guide sensor 10 shown in FIG. 1 is monitored and it is determined whether the CDR guide unit 2 is attached to the image-forming apparatus 100. If the CDR guide unit 2 is not attached, it is determined whether the recording unit 115 shown in FIG. 1 can perform the recording process in. Step 1005. If the CDR guide unit 2 is attached to the image-forming apparatus 100, the operation/display unit 108 shown in FIG. 1 displays a message that the recording process cannot be performed in Step 1010 and the process proceeds to Step 1012.

If it is determined that the recording unit 415 can perform the recording process in Step 1005, a command to supply the paper sheet from the automatic sheet feeder (ASF), that is, the paper tray 5 shown in FIG. 2, is transmitted to the recording unit 115 via the USB interface in Step 1006. If it is determined that the recording process cannot be preformed, the operation/display unit 108 shown in FIG. 1 displays a message indicating that the recording process cannot be performed in Step 1011 and the process proceeds to Step 1012. In Step 1012, the print data obtained in Step 1003 is stored in the image memory 104 shown in FIG. 1.

In Step 1007, the print data obtained in Step 1003 is transmitted to the recording unit 115 via the USB interface. In Step 1008, the recording unit 115 receives the print data transmitted in Step 1007 via the USB interface and performs a process of printing the print data on the paper sheet supplied from the automatic sheet feeder. In Step 1009, it is determined whether all of the data are processed. If all of the data are processed, a finishing process is performed and the facsimile-receiving process ends. If there are data which are not yet processed, the process returns to Step 1004.

Third Embodiment

Next, a PC printing process performed by an image-forming apparatus according to a third embodiment of the present invention will be described below.

The construction of the image-forming apparatus according to the third embodiment is similar to the image-forming apparatus 100 shown in FIG. 1.

Figure 11:
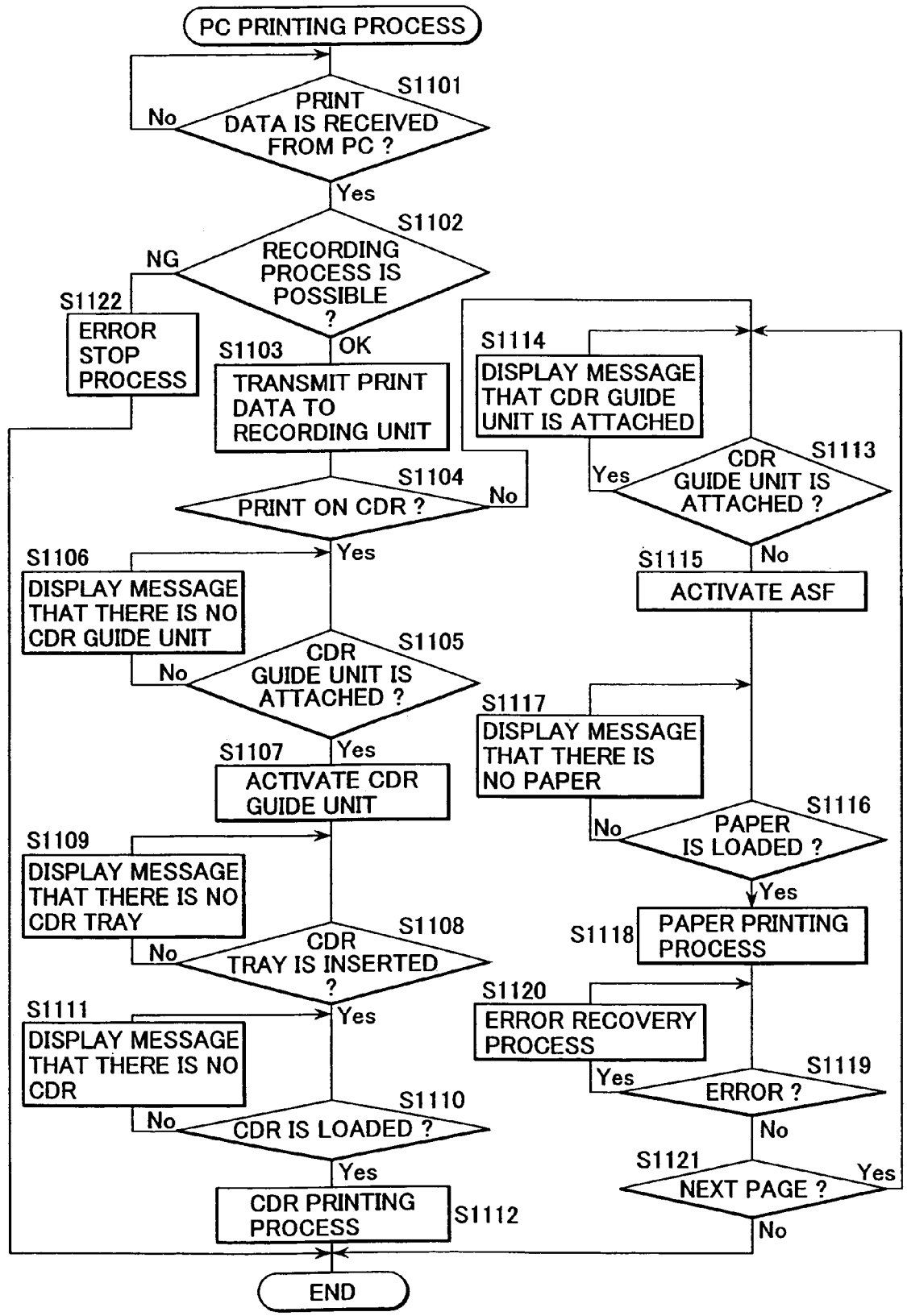
FIG. 11 is a flowchart of a PC printing process performed by an image-forming apparatus according to a third embodiment of the present invention.

FIG. 11 is a flowchart of the PC printing process performed by the image-forming apparatus according to the third embodiment of the present invention.

First, in Step 1101, it is determined whether print data is received from the external information processing terminal shown in FIG. 1 which is connected to the image-forming apparatus via the USB interface. When the print data is received, it is determined whether the recording unit 115 shown in FIG. 1 can perform the recording process in Step 1102. If it is determined that the recording process cannot be performed, the error-stop process is performed and the process ends. If it is determined that the recording process can be performed, the print data is transmitted to the recording unit 115 in Step 1103.

In Step 1104, the print data transmitted to the recording unit 115 is analyzed and it is determined whether a command to print on the CDR is issued. The process proceeds to Step 1105 if a command to print the CDR is issued, and the process proceeds to Step 1113 if a command to print on other medium (using the automatic sheet feeder) is issued. In Step 1105, the signal output from the guide sensor 10 shown in FIG. 1 is monitored and it is determined whether the CDR guide unit 2 is attached to the image-forming apparatus 100.

If the CDR guide unit 2 is not attached, the operation/display unit 108 shown in FIG. 1 displays an error message indicating that the CDR guide unit 2 is not attached in Step 1106, and the process waits until the CDR guide unit 2 is attached.

If the CDR guide unit 2 is attached, the CDR guide unit 2 is activated in Step 1107. When the CDR guide unit 2 is activated, it is determined whether the CDR tray 3 shown in FIG. 3 is installed in Step 1108 by monitoring light reflected from the CDR tray 3 with the CDR-P sensor 11 shown in FIG. 1.

If the CDR tray 3 is not installed, the operation/display unit 108 shown in FIG. 1 displays an error message indicating that the CDR tray 3 is not installed in Step 1109, and the process waits until the CDR tray 3 is installed.

If the CDR tray 3 is installed, the CDR tray 3 is inserted into the image-forming apparatus 100 and it is determined whether the CDR 4 is placed on the CDR tray 3 in Step 1110 by monitoring light reflected from the CDR 4 with the CDR-P sensor 11 shown in FIG. 1.

If the CDR 4 is not placed on the CDR tray 3, the operation/display unit 108 shown in FIG. 1 displays an error message indicating that there is no CDR in Step 1111, and the process waits until the CDR 4 is loaded.

If the CDR 4 is placed on the CDR tray 3, a process of printing on the CDR is started in Step 1112, and the process ends when all of the print data is printed.

In Step 1113, the signal from the guide sensor 10 shown in FIG. 1 is monitored and it is determined whether the CDR guide unit 2 is attached to the image-forming apparatus 100. If the CDR guide unit 2 is attached to the image-forming apparatus 100, the operation/display unit 108 shown in FIG. 1 displays a message indicating that the printing process cannot be performed in Step 1114.

If the CDR guide unit 2 is not attached to the image-forming apparatus 100, the automatic sheet feeder (ASF), that is, the paper tray 5, is activated in Step 1115, and the process of supplying the paper sheet is started. In Step 1116, it is determined whether the paper sheet is normally supplied by the automatic sheet feeder. If it is determined that there is no paper sheet, the operation/display unit 108 shown in FIG. 1 displays an error message indicating that there is no paper sheet in Step 1117, and the process waits until it is determined that the paper sheet is loaded. If it is determined that the paper sheet is loaded, a process of printing on the paper sheet is performed in Step 1118.

In Step 1119, it is determined whether an error has occurred in the recording unit. If a recoverable error occurs, for example, when there is no ink or when paper jam occurs, the operation/display unit 108 shown in FIG. 1 displays an error message explaining the situation in Step 1120 and the process waits until the error is resolved. When the error is resolved, it is determined whether there is print data for the next page which is not yet printed in Step 1121. The process returns to Step 1113 if there is data which is not yet printed, and the process ends if all of the data are printed.

Fourth Embodiment

Next, a memory-card printing process performed by an image-forming apparatus according to a fourth embodiment of the present invention will be described below.

The construction of the image-forming apparatus according to the fourth embodiment is similar to the image-forming apparatus 100 shown in FIG. 1.

Figure 12:
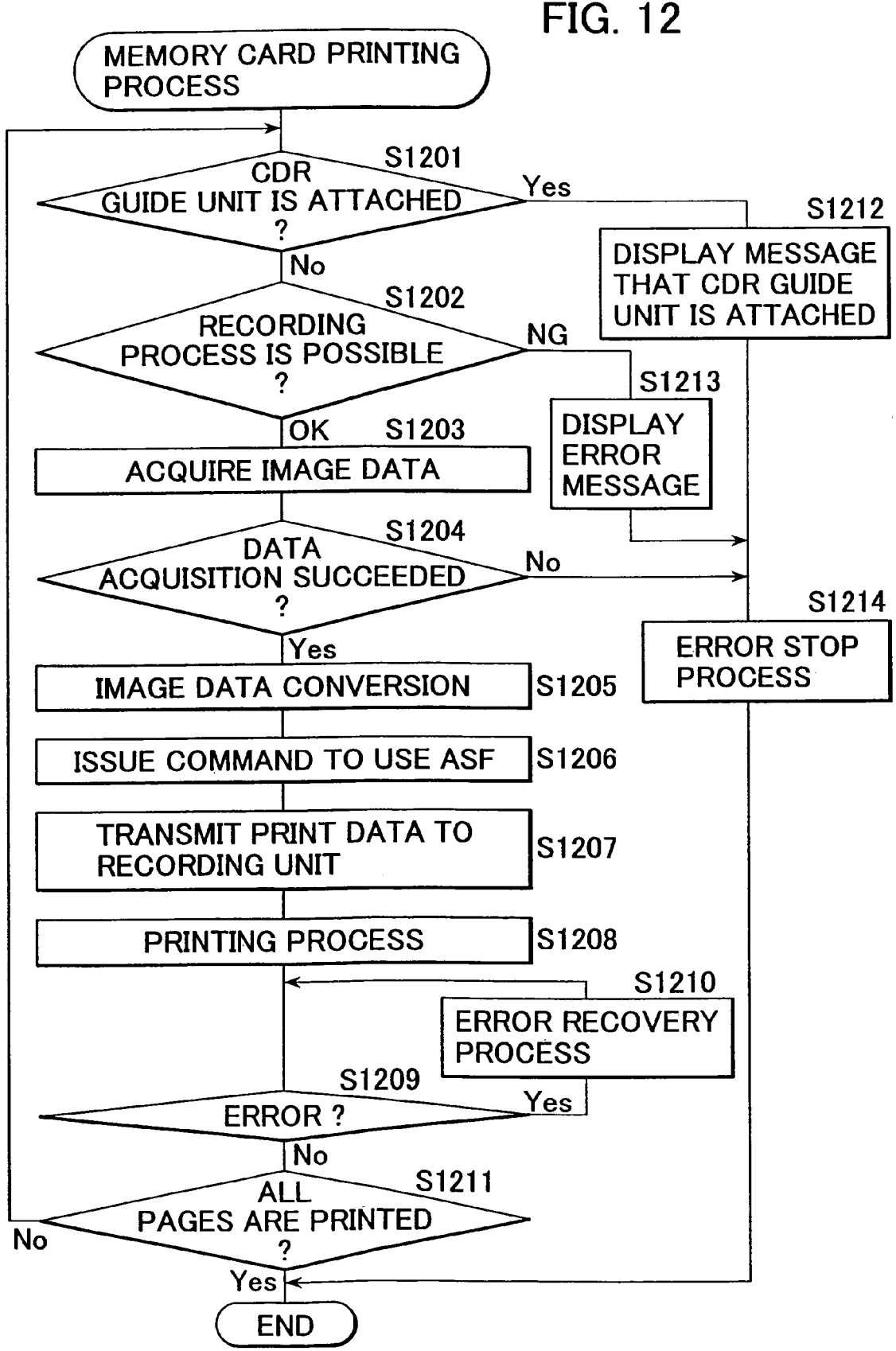
FIG. 12 is a flowchart of a memory-card printing process performed by an image-forming apparatus according to a fourth embodiment of the present invention.

FIG. 12 is a flowchart of the memory-card printing process performed by the image-forming apparatus according to the fourth embodiment of the present invention.

When a command to start the memory-card printing process is issued by the user, the signal output from the guide sensor 10 shown in FIG. 1 is monitored and it is determined whether the CDR guide unit 2 is attached to the image-forming apparatus 100, as shown in FIG. 2, in Step 1201. If the CDR guide unit 2 is not attached, it is determined whether the recording unit 115 shown in FIG. 1 can perform the recording process in Step 1202. If the CDR guide unit 2 is attached, the operation/display unit 108 shown in FIG. 1 displays a message indicating that the printing process cannot be performed since the CDR guide unit 2 is attached to the image-forming apparatus 100 in Step 1212, and the process proceeds to Step 1214.

If it is determined that the recording unit 115 can perform the recording process in Step 1202, image data stored in a memory card which is inserted in a memory card drive 116 shown in FIG. 1 is acquired via the USB interface under the control of a memory card controller 117 in Step 1203. If it is determined that the recording process cannot be performed, the operation/display unit 108 shown in FIG. 1 displays a message indicating that the recording process cannot be performed in Step 1213 and the process proceeds to Step 1214.

In Step 1204, it is determined whether the image data is acquired normally. If the image data is acquired normally, the process proceeds to Step 1205. If the image data is not acquired normally because, for example, the memory card is not inserted, image data stored in the memory card is damaged, or the memory card drive is malfunctioning, the process proceeds to Step 1214.

In Step 1214, the error-stop process is performed in which the recording tasks are stopped and the parameters are cleared. In Step 1205, the data converter 105 converts the image data acquired in Step 1203 into print data which can be printed by the recording unit 115.

In Step 1206, a command to supply the paper sheet from the automatic sheet feeder (ASF), that is, the paper tray 5 shown in FIG. 2, is transmitted to the recording unit 115 via the USB interface. In Step 1207, the print data obtained in Step 1205 is transmitted to the recording unit 115 via the USB interface. In Step 1208, the recording unit 115 receives the print data transmitted in Step 1207 via the USB interface and performs a process of printing on the paper sheet supplied from the automatic sheet feeder.

In Step 1209, it is determined whether an error has occurred during the printing process. If a recoverable error occurs, for example, when there is no paper or ink or when paper jam occurs, an error recovery process is performed in which a message prompting the user to take a suitable action is shown or a key operation is received in Step 1210. If the error is resolved, the process proceeds to Step 1211. In Step 1211, it is determined whether all of the pages are printed. If all of the pages are printed, a finishing process is performed and the PC printing process ends. If there are pages which are not yet printed, the process returns to Step 1201.

In the above-described embodiments, the image-forming apparatus includes a first monitor which detects whether a non-paper-medium supplier is attached to the main body of the image-forming apparatus. When a normal copying process is selected but the first monitor determines that the non-paper-medium supplier is attached to the main body of the image-forming apparatus, the copying process is stopped immediately. Therefore, a copy image can be prevented from being printed on a non-paper medium such as a CDR and the image-forming apparatus can immediately return to the standby mode without performing unnecessary processes such as activation of a reading unit and a recording unit. In, addition, an error message indicating that the printing process cannot be performed since the non-paper-medium supplier is attached is shown on the main body of the image-forming apparatus. Thus, the reason why the printing process has stopped can be displayed on the main body of the image-forming apparatus.

In addition, in the case in which the image-forming apparatus has a facsimile function, the first monitor detects whether the non-paper-medium supplier is attached to the main body of the image-forming apparatus when a facsimile is received. If the non-paper-medium supplier is attached, the received facsimile image data is not transmitted to the recording unit but is recorded in s storage medium installed in the main body. Accordingly, the facsimile image can be immediately and reliably stored and can be prevented from being printed on the non-paper medium such as a CDR. Then, if the non-paper-medium supplier is removed, the facsimile image data can be printed on a paper medium.

In addition, in the case in which the image-forming apparatus has a function of reading image data stored in a storage medium such as a memory card which can be detachably attached to the main body of the image-forming apparatus, the first monitor detects whether the non-paper-medium supplier is attached to the main body of the image-forming apparatus when a command to print the image data stored in the storage medium attached to the main body is issued. If the non-paper-medium-supplier is attached, the process of printing the image data stored in the storage medium is stopped. Therefore, the image data can be prevented from being printed on the non-paper medium such as a CDR and the image-forming apparatus can immediately return to the standby mode without performing unnecessary processes such as activation of the reading unit and the recording unit.

In addition, the above-described image-forming apparatus further includes a designating unit for designating whether the paper medium is to be supplied to the printing unit by the paper-medium supplier or the non-paper medium is to be supplied to the printing unit by the non-paper-medium supplier. When the image data obtained from the reading unit, the image data read from the storage medium attached to the main body, or the print data transmitted from the externally connected PC is printed and when the designating unit designates that the non-paper-medium is to be supplied by the non-paper-medium supplier, the process of activating the reading unit, reading from the storage medium, or printing the print data obtained from the externally connected PC is stopped if the first monitor determines that the non-paper-medium supplier is not attached to the main body. Therefore, the image data can be prevented from being printed on a wrong medium.

In addition, when the image data obtained from the reading unit, the image data read from the storage medium attached to the main body, or the print data transmitted from the externally connected PC is printed and when the designating unit designates that the paper-medium is to be supplied by the paper-medium supplier, the process of activating the reading unit, reading from the storage medium, or printing the print data obtained from the externally connected PC is stopped if the first monitor determines that the non-paper-medium supplier is not attached to the main body. Therefore, the image data can be prevented from being printed on a wrong medium.

In addition, the above-described image-forming apparatus further includes a second monitor which detects, for example, whether the medium such as a CDR is loaded in the non-paper-medium supplier and determines whether the process of supplying the medium is possible and a display unit which displays an error massage on the main body of the image-forming apparatus depending on the result of the determination obtained by the second monitor. When the image data obtained from the reading unit, the image data read from the storage medium attached to the main body, or the print data transmitted from the externally connected PC is printed and when the designating unit designates that the non-paper-medium is to be supplied by the non-paper-medium supplier, even if the first monitor determines that the non-paper-medium supplier is attached to the main body, the process of activating the reading unit, reading from the storage medium, or printing the print data obtained from the externally connected PC is stopped if the second monitor determines that the non-paper-medium supplier cannot be driven, and an error message corresponding to the situation is displayed on the main body of the image-forming apparatus. Thus, the reason why the process cannot be performed can be displayed on the main body, and it is possible to prompt the user to take a suitable action, for example, to insert the medium such as a CDR.

As described above, the image-forming apparatus according to the present invention includes a first monitor which detects whether a non-paper-medium supplier is attached to the main body of the image-forming apparatus. When a normal copying process is selected but the first monitor determines that the non-paper-medium supplier is attached to the main body of the image-forming apparatus, the copying process is stopped immediately. Therefore, the present invention provides an advantage in that a copy image can be prevented from being printed on a non-paper medium such as a CDR and the image-forming apparatus can immediately return to the standby mode without performing unnecessary processes such as activation of a reading unit and a recording unit. In addition, an error message indicating that the printing process cannot be performed since the non-paper-medium supplier is attached is shown on the main body of the image-forming apparatus. Thus, the reason why the printing process has stopped can be displayed on the main body of the image-forming apparatus.

Fifth Embodiment

In a fifth embodiment, components similar to those of the first to fourth embodiments are denoted by the same reference numerals and explanations thereof are, thus omitted.

Figure 13:
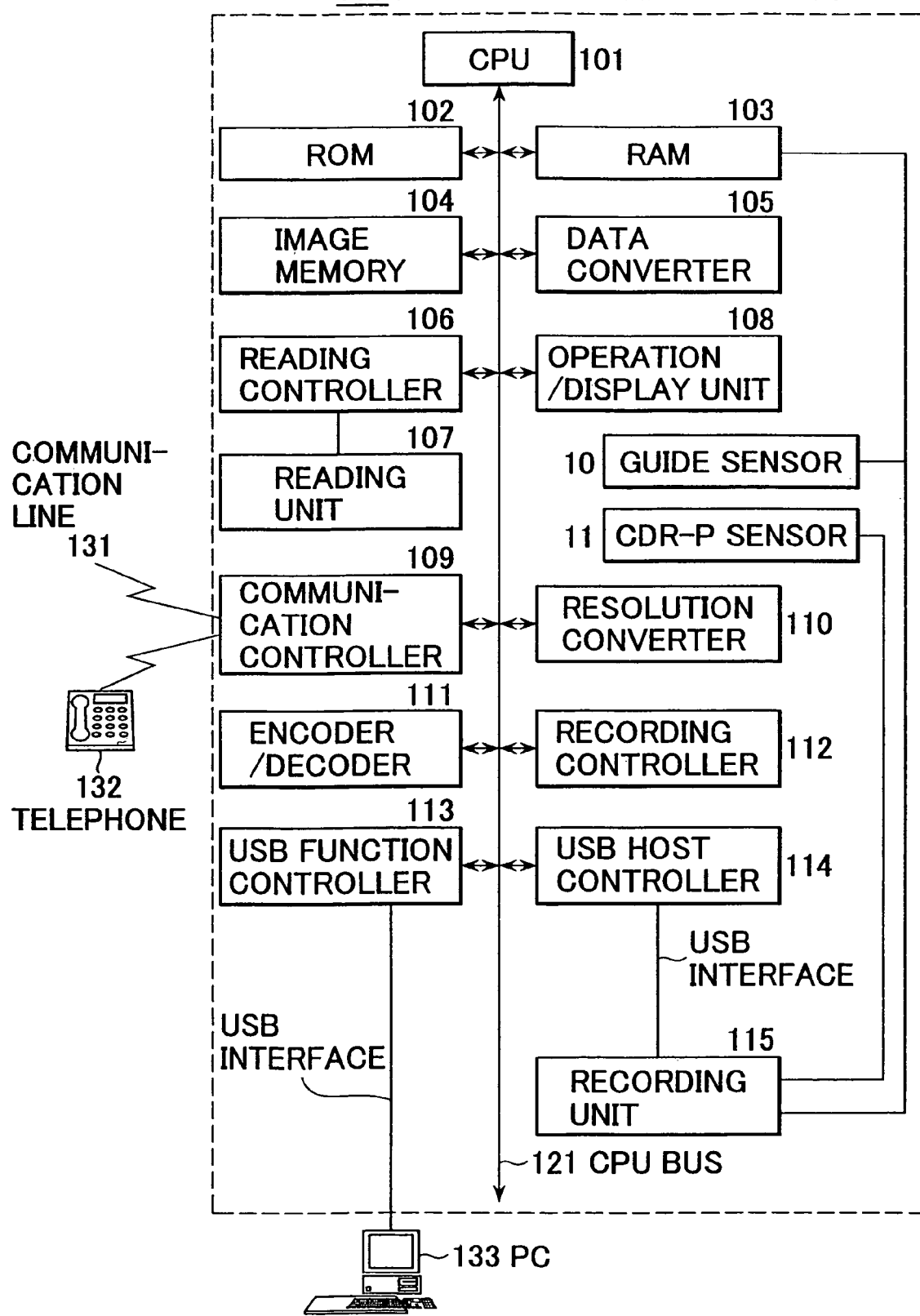
FIG. 13 is a schematic block diagram of an image-forming apparatus according to a fifth embodiment of the present invention.

With reference to FIG. 13, a communication controller 109 includes a modulator/demodulator (MODEM), a network control unit (NCU), etc., and is connected to an analog communication line (public switched telephone network (PSTN)) 131 and an external telephone 132. The communication controller 109 performs communication control under the T.30 protocol and line control of call-ins and call-outs on the communication line. The communication controller 109 will be described in more detail below with reference to FIG. 14.

Figure 14:
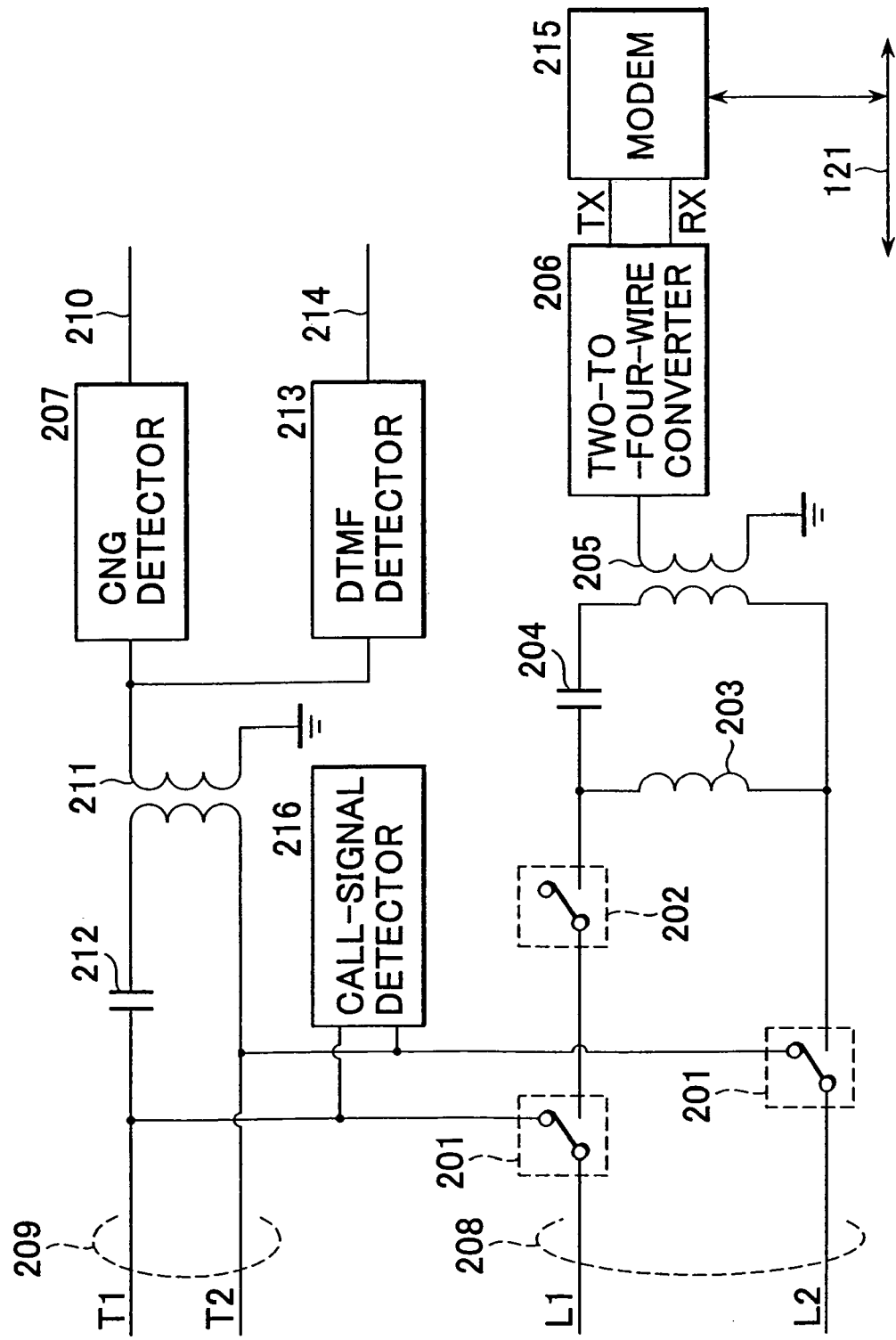
FIG. 14 is a block diagram showing the detailed construction of a communication controller.

FIG. 14 is a block diagram showing the detailed construction of the communication controller 109.

The communication controller 109 includes CML relays 201 and a pulse relay (P relay) 202, an electrical circuit 203, a direct current (DC) cut capacitor 204, a 600-to-600 ohm transformer 205, a two-to-four-wire converter circuit 206, a CNG detector circuit 207, a DTMF detector circuit 213, a modem 215, a CPU bus 121, and a call-signal detector circuit 216.

The CML relays 201 are used for switching a line 208 between the telephone and the facsimile-receiving unit, and the pulse relay (P relay) 202 is used for generating a dial pulse. The electrical circuit 203 serves as a RET coil which forms a direct current loop or has a similar function, and the 600-to-600 ohm transformer 205 separates the line from the facsimile-receiving unit.

The DC cut capacitor 204 supplies only the alternating current to the 600-to-600 ohm transformer 205, and the two-to-four-wire converter circuit 206 separates the output from the 600-to-600 ohm transformer 205 between transmission (TX) and reception (RX). The modem 215 modulates and demodulates the facsimile signal, and is connected to the CPU bus 121.

The call-signal detector circuit 216 detects a call signal, and a capacitor 212 is another DC cut capacitor. The output signal from a transformer 211 is used for monitoring signals on the line 208 and a line 209 connected to the telephone when the CML relays 201 are switched to the telephone.

The CNG detector circuit 207 detects the CNG tone and outputs an output signal 210, and is constructed of a PLL circuit. In addition, the DTMF detector circuit 213 outputs an output signal 214.

Figure 15:
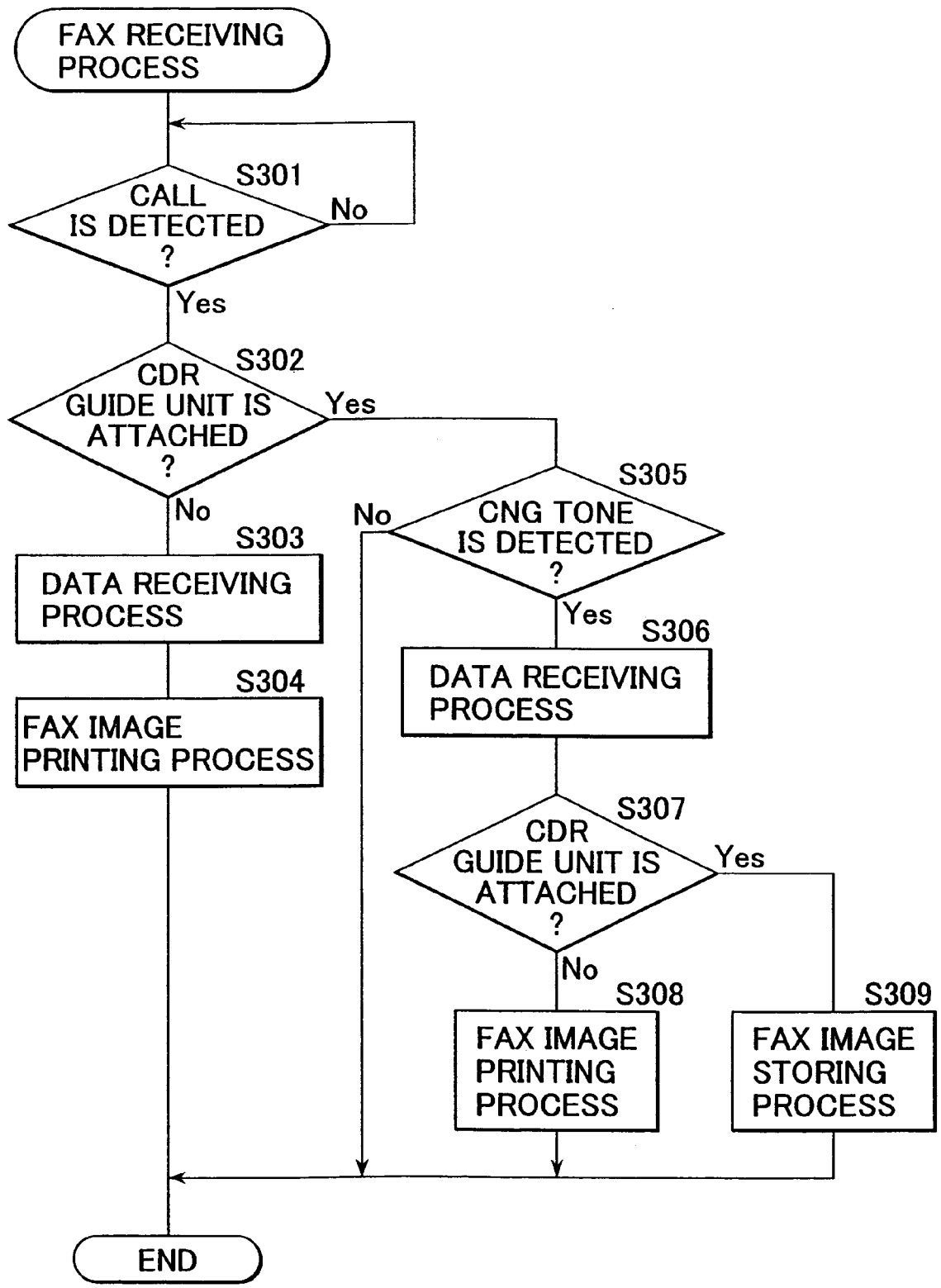
FIG. 15 is a flowchart of a facsimile-receiving process according to the fifth embodiment of the present invention.

FIG. 15 is a flowchart of a facsimile-receiving process according to the fifth embodiment.

First, in Step 301, the call-signal detector circuit 216 determines whether there is a call from the communication line. If there is a call, the guide sensor 10 detects whether the CDR guide unit 2 is attached in Step 302.

If the CDR guide unit 2 is not attached in Step 302, the process of printing on the paper sheet can be performed using the paper path, that is, the paper-medium supplier. Therefore, a facsimile-data-receiving process is performed in Step 303.

The facsimile-data-receiving process is performed in accordance with a receiving mode set in the image-forming apparatus 100. More specifically, if the receiving mode is set to a forced-facsimile-receiving mode, the CML relays 201 are switched to the modem and a signal used for receiving a facsimile (for example, a CED tone) is transmitted. If the receiving mode is set to a manual-facsimile-receiving mode, the CML relays 201 are not switched and the call is received by the external telephone 132. In Step 304, the received facsimile image data is printed on the paper sheet supplied by the paper-medium supplier and the facsimile-receiving process is finished.

If the CDR guide unit 2 is attached in Step 302, the process of printing on the paper sheet using the paper path, that is, the paper-medium supplier cannot be performed as described above. Therefore, the call is received by the external telephone 132 irrespective of the receiving mode set in the image-forming apparatus 100.

If the user who has started the CDR printing process becomes aware of the call and receives it with the external telephone, it is determined whether the CNG tone is detected by the CNG detector circuit 207 in Step 305. If the CNG tone is not detected, it means that the call is a telephone call. Therefore, the facsimile-receiving process is finished. If the CNG tone is detected, the CML relays 201 are switched to the modem and the facsimile-data-receiving process is performed in Step 306.

When the user picks up the telephone, he or she hears the CNG tone from the calling machine and realizes that the call is a facsimile transmission. Therefore, the user can remove the CDR guide unit 2 so that the received facsimile image can be printed on the paper sheet supplied by the paper-medium supplier. In Step 307, the guide sensor 10 detects whether the CDR guide unit 2 is removed. If the CDR guide unit 2 is removed, the process proceeds to Step 308 and the process of printing the facsimile image on the paper sheet supplied by the paper-medium supplier is performed and the facsimile-receiving process is finished.

If the CDR guide unit 2 is still attached in Step 307, the process-of printing on the paper sheet cannot be performed. Accordingly, the process proceeds to Step 309 and the received image data is stored in the memory 103.

As described above, even if a facsimile is received while the CDR guide unit 2 is attached and the CDR printing process is performed, the user can see the facsimile by printing it on the paper sheet.

Sixth Embodiment

In the fifth embodiment, the facsimile data is received when the CNG tone from the calling machine is detected after the call is received by the user with the telephone. In the sixth embodiment, when the user receives the call with the telephone, the user can start the facsimile-data-receiving process by operating the telephone.

Since the sixth embodiment is similar to the fifth embodiment except for the facsimile-receiving process, only a flowchart of the facsimile-receiving process according to the sixth embodiment will be described below.

Figure 16:
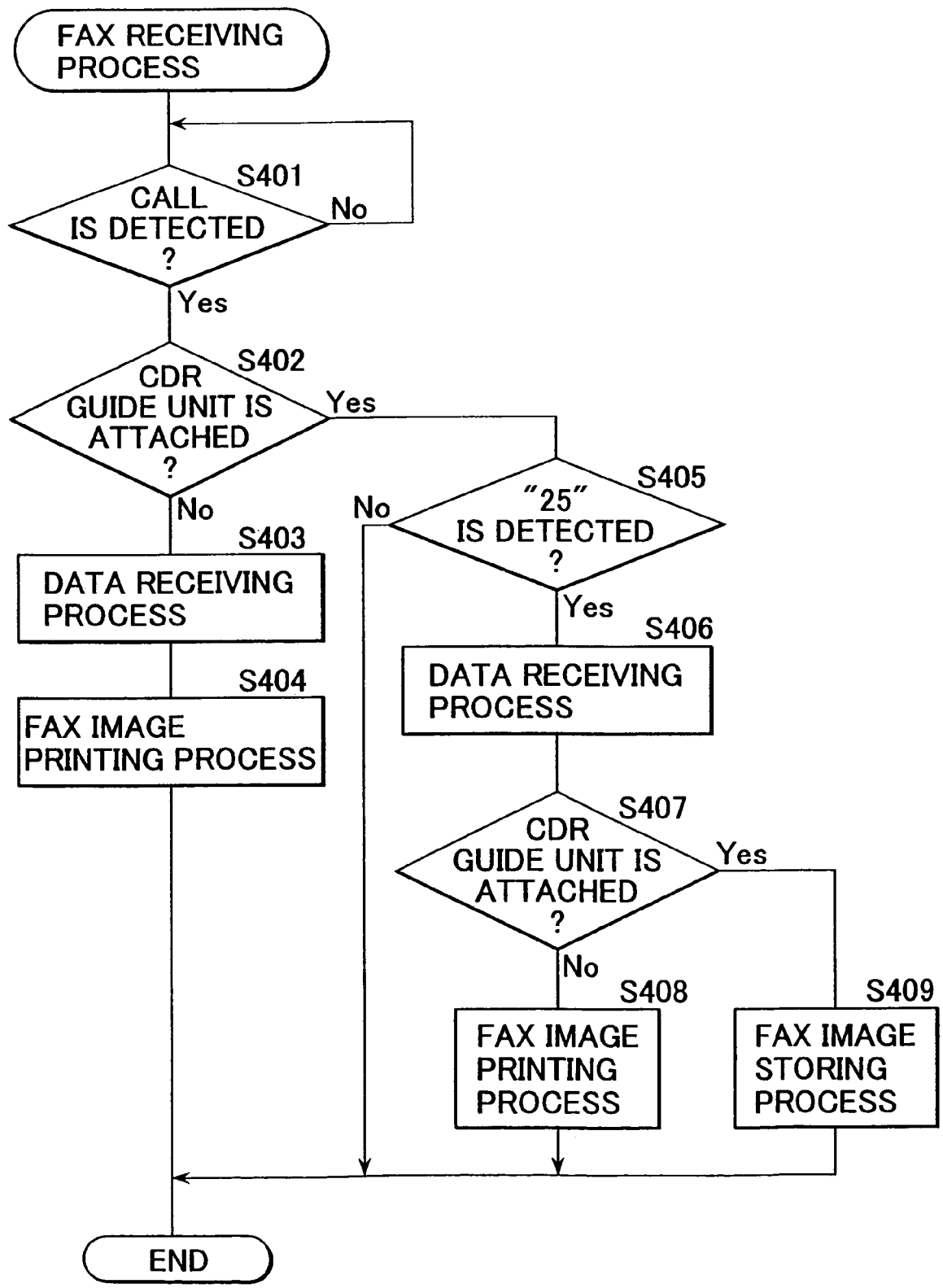
FIG. 16 is a flowchart of a facsimile-receiving process according to a sixth embodiment of the present invention.

FIG. 16 is a flowchart of the facsimile-receiving process according to the sixth embodiment.

First, in Step 401, the call-signal detector circuit 216 determines whether there is a call from the communication line. If there is a call, the guide sensor 10 detects whether the CDR guide unit 2 is attached in Step 402. If the CDR guide unit 2 is not attached, the process of printing on the paper sheet can be performed using the paper path, that is, the paper-medium supplier. Therefore, a facsimile-data-receiving process is performed in Step 403.

The facsimile-data-receiving process is performed in accordance with a receiving mode set in the image-forming apparatus 100. More specifically, if the receiving mode is set to a forced-facsimile-receiving mode, the CML relays 201 are switched to the modem and a signal used for receiving a facsimile (for example, a CED tone) is transmitted. In addition, if the receiving mode is set to a manual-facsimile-receiving mode, the CML relays 201 are not switched and the call is received by the external telephone 132. In Step 404, the received facsimile image data is printed on the paper sheet supplied by the paper-medium supplier and the facsimile-receiving process is finished.

If the CDR guide unit 2 is attached in Step 402, the process of printing on the paper sheet using the paper path, that is, the paper-medium supplier cannot be performed as described above. Therefore, the call is received by the external telephone 132 irrespective of the receiving mode set in the image-forming apparatus 100.

If the user who has started the CDR printing process becomes aware of the call, receives the call with the external telephone, and finds out that the call is a facsimile transmission, the user enters number "25" on the telephone to select the facsimile-data-receiving process. The number "25" is the default number and can be changed to an arbitrary number by the user.

In Step 405, it is determined whether the DTMF tone corresponding to "25" is detected by the DTMF detector circuit 213. If the DTMF tone corresponding to "25" is not detected, it means that the call is a telephone call. Therefore, the facsimile-receiving process is finished. If the DTMF tone corresponding to "25" is detected, the CML relays 201 are switched to the modem and the facsimile-data-receiving process is performed in Step 406.

During this time, the user can remove the CDR guide unit 2 so that the received facsimile image can be printed on the paper sheet supplied by the paper-medium supplier. In Step 407, the guide sensor 10 detects whether the CDR guide unit 2 is removed. If the CDR guide unit 2 is removed, the process proceeds to Step 408 and the process of printing the facsimile image on the paper sheet supplied by the paper-medium supplier is performed and the facsimile-receiving process is finished.

If the CDR guide unit 2 is still attached in Step 407, the process of printing on the paper sheet cannot be performed. Accordingly, the process proceeds to Step 409 and the received image data is stored in the memory 103.

Although the DTMF tone is detected in the flowchart shown in FIG. 16, the facsimile-data-receiving process can also be selected by detecting pulses corresponding to the number if the telephone uses pulse dialing.

According to the present embodiment, even if a facsimile is received while the CDR guide unit 2 is attached and the CDR printing process is performed, the user can see the facsimile by printing it on the paper sheet.

Accordingly, in the above-described embodiments, if a facsimile is received while the image-forming apparatus is set to a CDR print mode and the data to be printed on the CDR is being created by the user using the PC, the user is informed that the facsimile call is received. Accordingly, the user can change the setting of the MFP to a paper print mode and the received facsimile can be printed on the paper sheet. Therefore, a problem that the facsimile cannot be received because the memory is full does not occur.

According to the present invention, the call from the line is not received when the non-paper-medium supplier is attached to the main body of the image-forming apparatus and a facsimile-switching unit causes the facsimile-receiving unit to receive the call when the call is determined to be the facsimile transmission after the line is acquired by the telephone. Accordingly, even when the non-paper-medium supplier is attached to the main body of the image-forming apparatus, paper jam, which occurs when the process of printing on the paper medium is forcibly performed, can be prevented.

In addition, according to the present invention, if it is determined that the non-paper-medium supplier is not attached to the main body of the image-forming apparatus, the received image is printed by the printing unit. Accordingly, the problem that the facsimile image cannot be received because the memory is full does not occur.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-forming apparatus comprising:
    a printing unit which prints an image on a paper medium or a computer-readable medium in accordance with image data;
    a paper-medium supplier which supplies the paper medium to the printing unit;
    a computer-readable medium supplier which supplies the computer-readable medium to the printing unit;
    a receiving unit which receives a facsimile image transmitted via a communication line;
    a storage unit which stores the facsimile image received by the receiving unit;
    a connecting unit which connects an external telephone to a main body of the image-forming apparatus; and
    a facsimile-switching unit which causes the receiving unit to receive the facsimile after the communication line is acquired by the telephone,
    wherein a controller does not allow a call from the communication line to be received if the computer-readable medium is supplied and the communication line is not acquired by the telephone, and the controller allows a call from the communication line to be received after the communication line is acquired by the telephone although the computer-readable medium is supplied, the controller controls the facsimile-switching unit such that the facsimile-switching unit causes the receiving unit to receive the facsimile image, the controller causes the printing unit to print the facsimile image received by the receiving unit in a case in which the paper-medium is supplied, and the controller causes the storage unit to store the facsimile image received by the receiving unit in a case in which the computer-readable medium is supplied.

2. An image-forming apparatus according to claim 1, wherein the computer-readable medium supplier is detachably attached to the main body of the image-forming apparatus, and the paper-medium supplier supplies the paper-medium in a case in which the computer-readable medium supplier is detached.

3. A control method of an image-forming apparatus comprising:
    a printing step of printing an image on a paper medium or a computer-readable medium in accordance with image data;
    a paper-medium supplying step of supplying the paper medium in said printing step;
    a computer-readable medium supplying step of supplying the computer-readable medium in said printing step;
    a receiving step of receiving a facsimile image transmitted via a communication line;
    a storing step of storing the facsimile image received in said receiving step;
    a connecting step of connecting an external telephone to a amin body of the image-forming apparatus; and
    a facsimile-switching step of causing execution of the receiving step to receive the facsimile after the communication line is acquired by the telephone,
    wherein a controller does not allow a call from the communication line to be received if the computer-readable medium is supplied and the communication line is not acquired by the telephone, and the controller allows a call from the communication line to be received after the communication line is acquired by the telephone although the computer-readable medium is supplied, the controller controls the facsimile-switching step such that the facsimile-switching step causes the receiving step to receive the facsimile image, the controller causes the printing step to print the facsimile image received in the receiving step in a case in which the paper-medium is supplied, and the controller causes the storage step to store the facsimile image received in the receiving step in a case in which the computer-readable medium is supplied.

4. A control method of an image-forming apparatus according to claim 3, wherein said computer-readable medium supplying step supplies the computer-readable medium by a computer-readable medium supply unit detachably attached to the main body of the image-forming apparatus, and said paper-medium supplying step supplies the paper-medium in a case in which the computer-readable medium supplier is detached.

5. An image-forming apparatus comprising:
    a printing unit which prints an image on a paper medium or a non-paper medium in accordance with image data;
    a paper-medium supplier which supplies the paper medium to the printing unit;
    a non-paper-medium supplier which supplies the non-paper medium to the pnnting unit;
    a receiving unit which receives a facsimile image transmitted via a communication line;
    a storage unit which stores the facsimile image received by the receiving unit;
    a connecting unit which connects an external telephone to a main body of the image-forming apparatus; and
    a facsimile-switching unit which causes the receiving unit to receive the facsimile after the communication line is acquired by the telephone,
    wherein a controller does not allow a call from the communication line to be received if the non-paper-medium is supplied and the communication line is not acquired by the telephone, and the controller allows a call from the communication line to be received after the communication line is acquired by the telephone although the non-paper-medium is supplied, the controller controls the facsimile-switching unit such that the facsimile-switching unit causes the receiving unit to receive the facsimile image, the controller causes the printing unit to print the facsimile image received by the receiving unit in a case in which the paper-medium is supplied, and the controller causes the storage unit to store the facsimile image received by the receiving unit in a case in which the non-paper medium is supplied.

6. A control method of an image-forming apparatus comprising:
    a printing step of printing an image on a paper medium or a non-paper medium in accordance with image data;

a paper-medium supplying step of supplying the paper medium in said printing step;

a non-paper-medium supplying step of supplying the non-paper medium in said printing step;

a receiving step of receiving a facsimile image transmitted via a communication line;

a storing step of storing the facsimile image received in said receiving step;

a connecting step of connecting an external telephone to a main body of the image-forming apparatus; and a facsimile-switching step of causing the receiving step to receive the facsimile after the communication line is acquired by the telephone, wherein a controller does not allow a call from the communication line to be received if the non-paper medium is supplied and the communication line is not acquired by the telephone, and the controller allows a call from the communication line to be received after the communication line is acquired by the telephone although the non-paper medium is supplied, the controller controls the facsimile-switching step such that the facsimile-switching step causes the receiving step to receive the facsimile image, the controller causes the printing step to print the facsimile image received in the receiving step in a case in which the paper-medium is supplied, and the controller causes the storage step to store the facsimile image received in the receiving step in a case in which the non-paper medium is supplied.

* * * * *